March 25, 1941.  H. R. STUART  2,236,161
AUTOMATIC SIGNAL CONTROLLER
Filed March 18, 1939  3 Sheets-Sheet 1
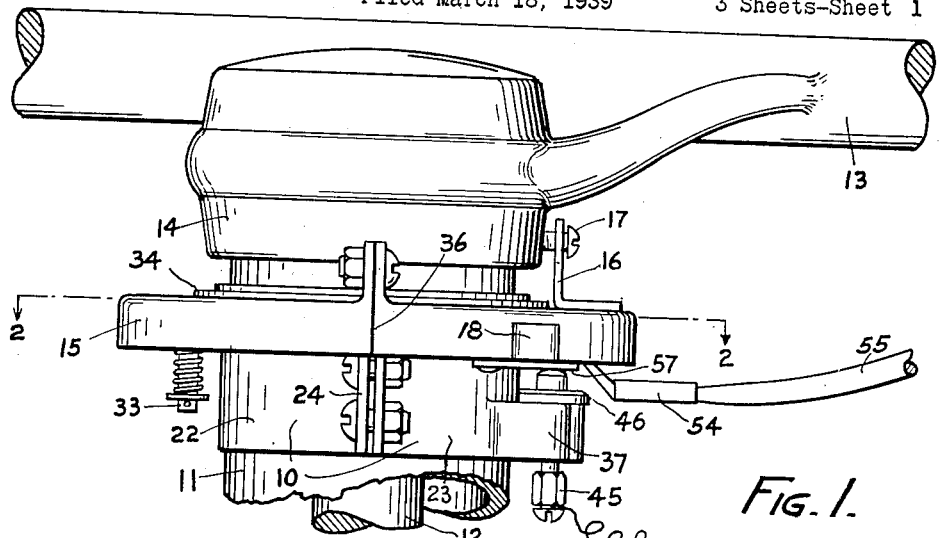
FIG. 1.
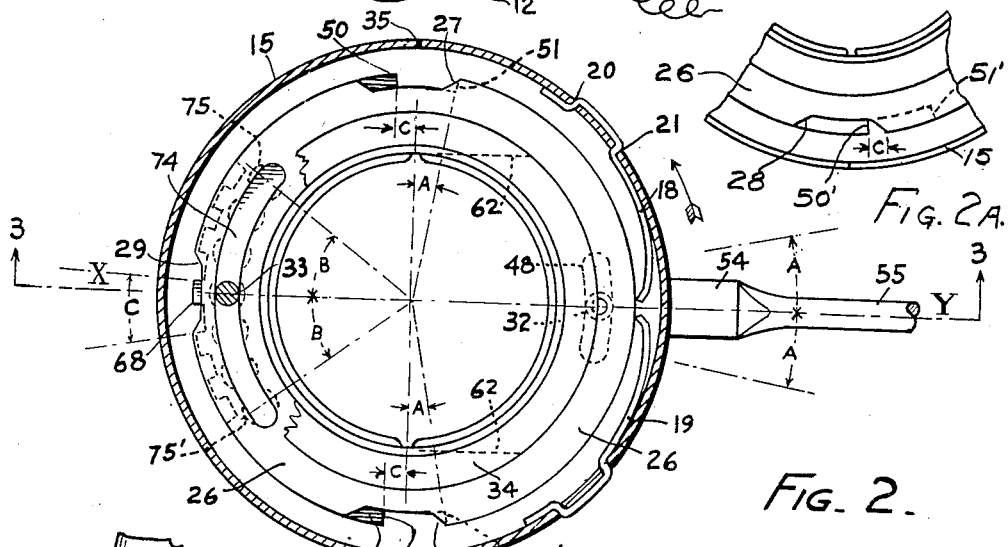
FIG. 2A.
FIG. 2.
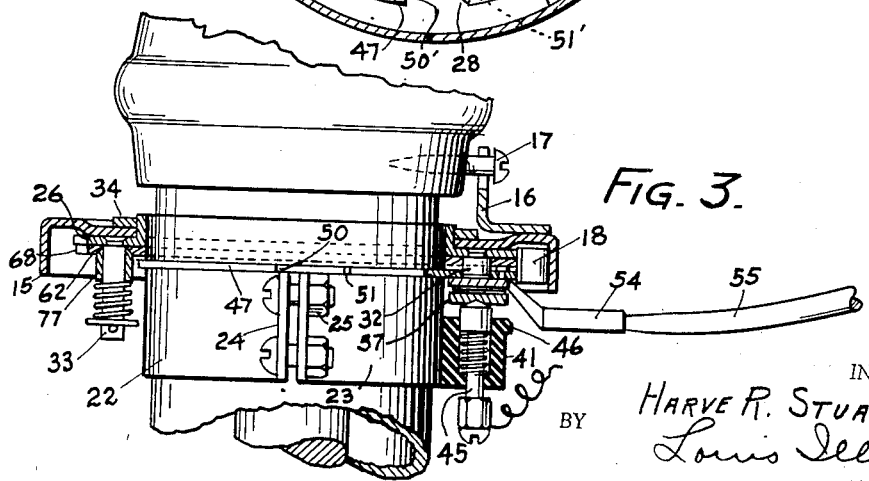
FIG. 3.
INVENTOR.
HARVE R. STUART
BY Louis Illmer
ATTORNEY.

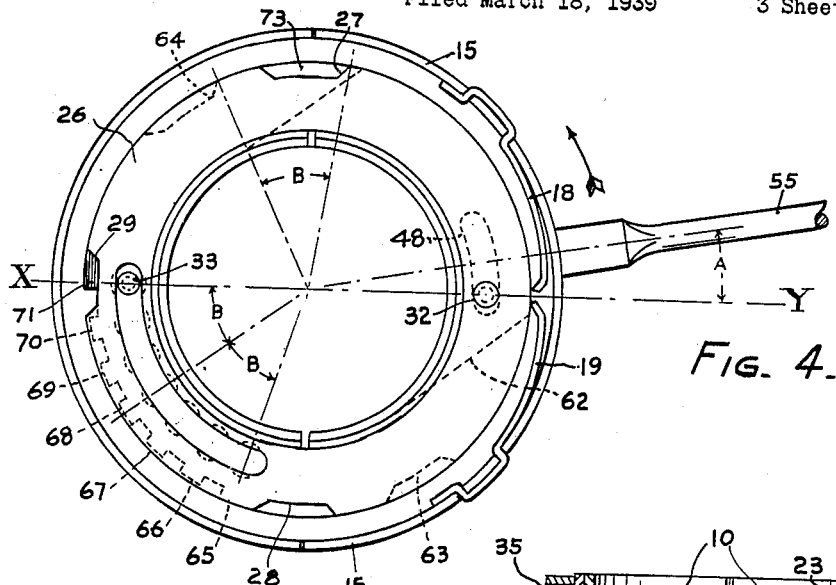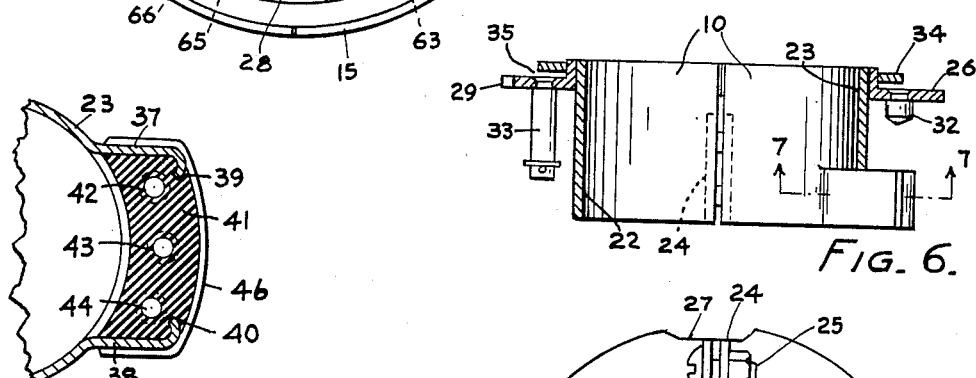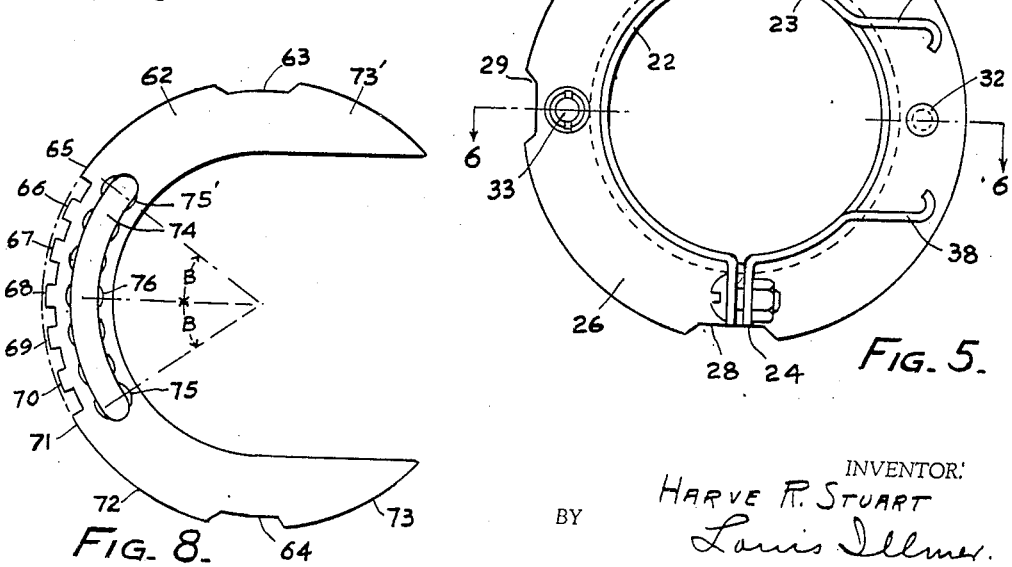

March 25, 1941.   H. R. STUART   2,236,161
AUTOMATIC SIGNAL CONTROLLER
Filed March 18, 1939   3 Sheets-Sheet 3
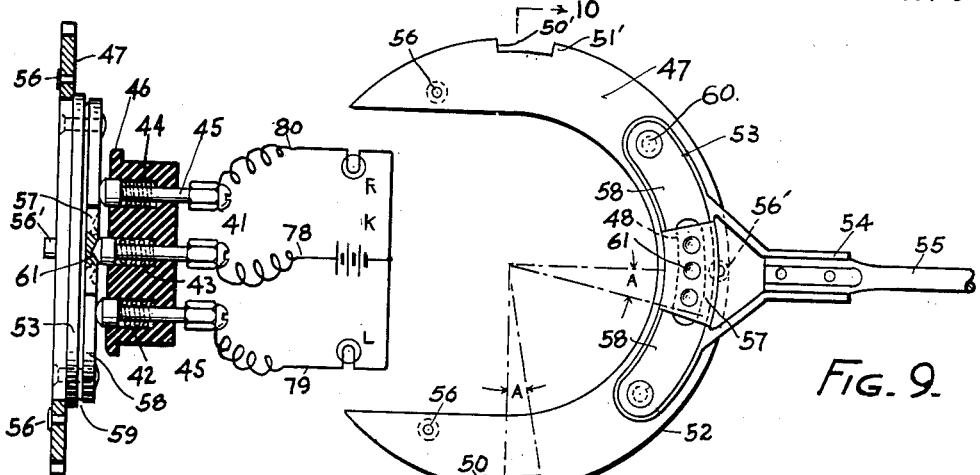
Fig. 9.
Fig. 10.
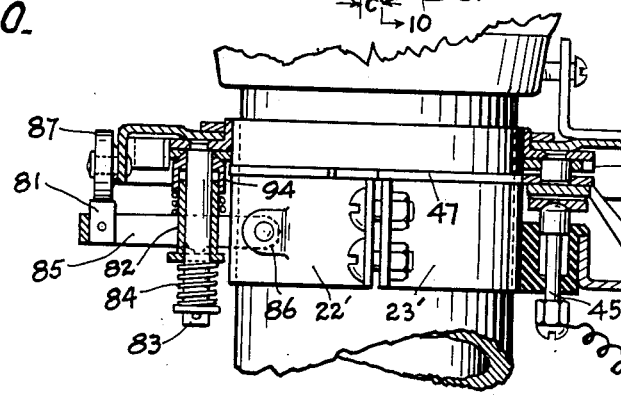
Fig. 11.
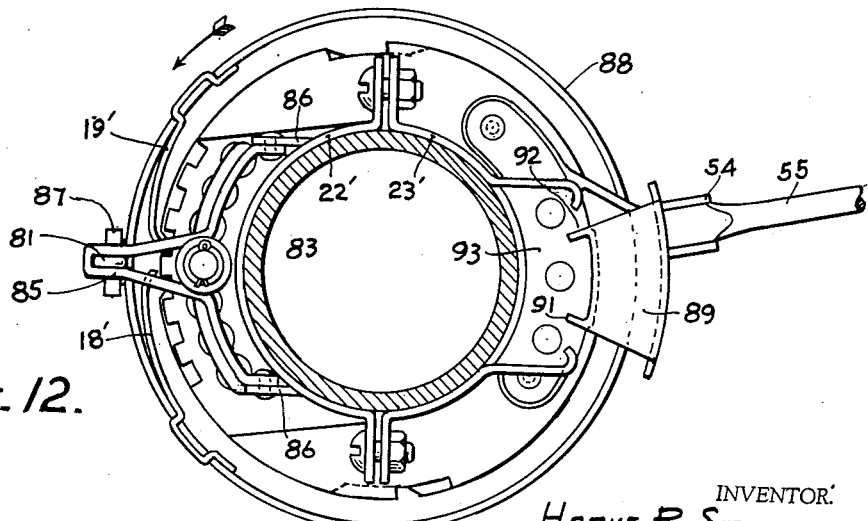
Fig. 12.
INVENTOR.
HARVE R. STUART.
BY Louis Illmer,
ATTORNEY.

Patented Mar. 25, 1941

2,236,161

UNITED STATES PATENT OFFICE 2,236,161

AUTOMATIC SIGNAL CONTROLLER

Harve R. Stuart, Springfield, Ohio, assignor of one-half to Louis Illmer, Cortland, N. Y.

Application March 18, 1939, Serial No. 262,599

11 Claims. (Cl. 200—59)

This invention pertains to improved remote control means for electrical signals, and more particularly has to do with a novel system for switching from the driver's seat, lightable direction indicating means for automotive vehicles or the like. The underlying principle thereof is primarily based upon a controllable clutch interconnection that is interposed between the steering wheel and an oscillatory switch actuating member.

As applied to such purposes, my assembled switch mechanism may comprise composite cam tracks respectively having cooperative profiles to include a stationary component and a companion oscillatory component. A make and break switch element may be operatively carried by the oscillatory part of my controller. Common opposed or double acting pawl means are preferably made to ride in straddling relation to all such multiple profiles. The stationary part may be devised as a perimetrically notched annulus attached to a fixed element of a steering wheel installation such as its conventional supporting column. The perimetric region of my oscillatory companion disclike plate may be equipped with reversely disposed pairs of outstanding kickon and kickoff cam edges that are movable in co-operative relation to the respective profile notches of the stationary annulus. Said pawl means are carried along in unison with the steering wheel movements in either direction and selectively brought into successive engagement with certain cam edges to cause a corresponding right hand or left hand direction signal to become active but only while making a relatively sharp vehicle turn.

A predetermined initial movement or leeway with respect to the straight ahead wheel station is allowed prior to the automatic setting of either such signal. In addition, said movable companion plate may be independently actuated by a manipulative shift lever whereby the driver may manually set a desired signal in advance of instituting a contemplated vehicle turn. My mated cam profiles are herein so arranged that should the driver fail to preshift said lever as intended, the present mechanism will overtake and pick up a proper kickon edge after the steering wheel has been turned beyond a prescribed leeway provision. When shifted into an active switch position, the movable companion plate is releasably retained therein by latch means until reversed into its neutral mid position by the pawl engagement of a mated kickoff edge.

Modern heavy duty busses, trucks or the like automotive vehicles usually require less than three completed wheel turns to steer around a sharp radial pathway and an identical number of reversed turns to straighten out such vehicles. In order to shield against unwanted pawl interference with certain of said outstanding track edges, I preferably provide for an interposed notched floating shoe having ratchet teeth thereon. When operative as a wheel turn recorder, such shoe teeth are intermittently engaged in sequence by one or the other of my opposed pawls in unison with the number of completed steering wheel turns. Any exposed kickon or kickoff edges are in such interim protectively shielded by the track profile given to my floating shoe. Shortly before the steering wheel returns to its central straight ahead station, said ratchet teeth serve to bring about and correctly time the exposure of a proper kickoff edge, thus allowing one such pawl to positively cut off a previously given signal and simultaneously shift the manipulative lever back into its neutral switch position, but only after a signalled vehicle turn has been substantially completed.

My movable companion disclike plate or oscillatory controller part may carry insulated commutator means preferably of the flat faced segment type arranged to selectively command different signal lamp circuits by closing certain make and break switch elements. In the present instance, three stationary contact brushes may be cooperatively mounted in row fashion beneath said commutator and when its segment is intermittently actuated by my movable companion plate, appropriate adjacent brushes become actively bridged to close a corresponding lamp circuit. In mid segment or neutral lever position, both outer contact brushes remain disconnected.

A characteristic of the present innovation lies in its fully automatic features whereby the shiftable lever may be manually actuated in advance of actually making a contemplated turn but which lever will be automatically picked up and positively shifted upon failure to effect such manipulation. Said lever is subsequently thrown back with certainty into its neutral position by the return movement of the steering wheel and placed ready to make another vehicle turn without energizing a wrong direction signal likely to mislead a trailing driver. Furthermore, the herein practiced method of masking the kickoff edges is such that even should a set controller lever be inadvertently returned into its neutral position prior to completing a vehicle turn or should said lever be preset to indicate a turn different from that actually executed, my mechanism will still correctly right itself without being thrown out of step. In addition, my movable companion plate together with its mated floating shoe may respectively be given a horseshoe contour whereby to facilitate dismantling of the controller mechanism without having to demount the installed steering wheel column.

The object of my improvements is to devise a simple and reliable controller mechanism of the indicated character of which all principal components may be economically manufactured as sheet metal stampings and readily installed on a steering wheel column without requiring any substantial alteration in conventional steering gear structure. A further aim is to provide for a compact and neat switch assembly that shall not deface the interior trim of a high class automobile, bus or truck to which it may be applied.

Embodied herein are also novel structural features including means adapted to readily demount such controller unit for repairs, and all of which aspects will hereinafter be more explicitly set forth. Reference is had to the accompanying three sheets of drawings that are illustrative of a specific embodiment of my invention and in which drawings:

Fig. 1 shows an exterior elevational view of my switch assembly concentrically installed about a steering wheel column.

Fig. 2 represents a transverse sectional top view taken along line 2—2 of Fig. 1, with its manipulative lever set in neutral position, while Fig. 2A is a fragmental detail thereof in which the cam profiles have been relatively shifted.

Fig. 3 illustrates a vertical section taken along line 3—3 of Fig. 2.

Fig. 4 depicts a view similar to Fig. 2 but with certain working parts shifted into a different position.

Figs. 5 to 7 inclusive detail a suitable split switch housing adapted to be clamped about the steering column.

Fig. 8 is a plan view of a preferred style of floating shoe.

Fig. 9 is a bottom plan view of my commutator carrying or movable plate.

Fig. 10 shows a sectional view taken along 10—10 of Fig. 9 and includes a row of contact brushes arranged in cooperative relation to a commutator segment together with a schematic wiring diagram.

Fig. 11 is similar to Fig. 3 but shows a modified assembly, and Fig. 12 reveals a bottom view thereof.

The present devices represent certain improvements over my prior Patent No. 2,112,935 dated April 5, 1938. Referring in detail to the drawings hereof, this exemplification is designed for both new and old equipment purposes and as such may comprise a tubular switch housing 10 designed as a sheet metal stamping intended to clamp about the tubular steering column 11. In practice, a spindle 12 is usually installed within said column and has a rotatable hand wheel rim 13 attached to the upper spindle end. Located beneath the wheel hub 14 is an apertured cup shaped or skirted casing 15 preferably of stamped sheet metal that rotatably circumscribes the column axis. Said casing may be provided with an upstanding ear lug 16 secured by a hub screw 17 whereby to actuate the casing in unison with the steering wheel movements. A pair of opposed pawls 18 and 19 preferably of the resilient strap type, may respectively have one crimped end fixedly inserted and intermeshed into complementary slits such as 20 and 21 cut into the casing skirt (see Fig. 2). The effective toe ends of such pawls are preferably placed in adjacency, as shown.

Said housing 10 may be formed in one piece but is preferably divided into semi-sleeve or substantially counterpart sections 22 and 23 (see Figs. 5 and 6) respectively provided with a pair of radially outstanding flanges such as 24 having a clamping bolt 25 therethrough by which to snugly grip the column 11. Where required, the sleeve bore may be shimmed to closely fit a smaller column size. The squared top edge of the opposed sleeve flanges may be utilized as a guide to sustain my movable cam disc thereon. The upper rim end of my jointed sleeve may be embraced by an apertured split disc or track annulus 26 whose components may be separately stamped up from sheet metal and respectively welded to a contiguous housing section. It will be obvious that such housing structure may likewise be made integral with a unitary annulus.

The more essential purpose is to provide for a stationary track annulus 26 whose perimetric region may be given an endless cam profile opposed trapezoidal or the like side indentations such as 27 and 28 having a similar medial cam indentation 29 interposed therebetween. In addition, said annulus may be equipped with a relatively short depending centering tit 32 and also with a relatively longer latch stem 33, whose purpose will appear presently.

The circular inner edge of the annulus 26 may be upturned and have welded thereto a split shoulder strip or the like collar means such as 34 to constitute a guide groove 35 into which the apertured edge region of the casing 15 is rotatably mounted (see Fig. 3). A plurality of outturned integral prongs may likewise be resorted to in lieu of such shoulder strip. Said casing may be split and bolted as at 36 to facilitate its assembly into the guide groove and to gain ready access to the concealed working parts.

Referring in further detail to my housing 10, the lower region of its sleeve section 23 may be provided with radially outstanding resilient clips 37 and 38 that respectively terminate in reversed hook tips (see Fig. 5). These claws may be shaped to clench oppositely inclined kerfs such as 39 and 40 formed in the flanged insulator block 41 (see Fig. 7). Said block may be moulded from Bakelite or the like plastic and provided with a row of adjoining cylindrical pockets 42, 43 and 44. Into each such pocket may be retractibly mounted an independent button headed contact screw or the equivalent brush agency such as 45 (see Fig. 3) that are distributed radially about the housing axis. The stationary brush block 41 is of a size that will readily snap between the clips 37 and 38, its height being definitely fixed by the block stop flange 46 when the inclined clip tips are snugly entered into said kerfs.

An oscillatory disclike plate or carrier 47 preferably but not necessarily stamped into horseshoe shape of the kind represented in Fig. 9, may be rotatably interposed between the upturned contact heads and the aforesaid stationary track annulus 26 as shown in Fig. 3. The horseshoe legs are assembled to snugly straddle the housing sleeve and the yoke region of said plate may be pierced by a guide slot 48 through which the centering tit 32 is entered. By removal of the split casing 15, the aperture 48 may be placed into registry with said tit and thus retain the plate 47 against radial withdrawal from the column sleeve 23 while the plate 47 is being actuated.

The outer perimeter of said plate legs may be oppositely indented to respectively afford complementary radial kickon edges 50 and 50', also the respective opposed kickoff edges 51 and 51'. In the case of a fully automatic controller, the lateral spacing between such mated kickon and kickoff edges is preferably made somewhat wider apart than the lever shift angle marked A in Fig. 2. The remaining outer perimeter of the plate 47 may be provided with a circular interconnecting edge 52 as shown. Beneath the bottom face of such horseshoe plate, I may centrally attach a forked pad member 53 of sheet metal whose medial region may extend radially outward into a socket 54 for mounting one end of the shiftable lever 55 (see Fig. 9). Said lever preferably extends radially and terminates adjacent to the steering wheel rim for convenient finger manipulation by the driver.

If desired, each plate leg may be drilled to receive the shanks of a pair of thin headed tacks such as 56 and a medial longer headed tack 56'. As a substitute equivalent antidrag means may be formed integrally, to the end that such three point spacer means may not tend to excessively drag its superimposed floating shoe. When assembled in place, the shiftable carrier plate 47 may likewise be upheld by triangular supports, in this instance being the opposed top edges of the flanges 24 and the button headed contact posts or the like brushes 45. The round nosed depending tit 32 bears lightly against the top of the attached pad 53 to resist brush thrust (see Fig. 3).

Beneath said pad member 53 there may be carried a single flat make and break element or equivalent commutator segment 57 having an insulator strip such as 58 flushly mounted at each end thereof. Underlying said segment is a thin sheet of insulation 59, said commutator assembly being fixedly secured by rivets such as 60. The allowable shift of the manipulative lever 55 may be limited to an angle A in either direction by the tit 32 acting as a stop against the ends of the slot 48. The button heads of the respective contact screws may also serve as latch means to retain the lever when set in neutral or either extreme position by the use of spaced conical depressions such as 61 which may be countersunk into the exposed face of the segment 57, as indicated.

Referring now to Fig. 8, this discloses a sheet metal floating shoe or clutch control member 62 that is preferably but not necessarily given a horseshoe contour similar in shape to the disclike plate 47. The assembled shoe is shown inserted flatwise between the upturned tack heads 56 of said plate and the annulus 26 to freely ride thereon. The outer perimetric shoe edge 72 is provided with opposed trapezoidal side indentations 63 and 64 which respectively register with the similar depressed cam profile portions 27 and 28 in the annulus 26 when the shift lever stands in its normal mid or neutral position in alignment with the straight away reference line X—Y of Fig. 2. At such time, the electrical contact between the commutator segment and both end brushes is broken and neither the right or left hand warning lamp will be lighted. Outwardly beyond the respective side indentations 63 and 64, the shoe perimeter preferably terminates in a trailing edge 73 and 73'.

The legs of said floating shoe also straddle the steering column and are intended to be reversely and overlappingly mounted with respect to corresponding legs of the plate 47 (see Fig. 2) and provides for a combined endless perimeter of an overall diametral size that corresponds to that of the annulus 26. The medial yoke portion of the floating shoe may be equipped with a series of square faced or double acting teeth such as 65 to 71 having a uniform pitch therebetween that is preferably made greater than that corresponding to the shift angle A. Inwardly from such teeth, the shoe 62 may be pierced by a relatively long guide slot 74 arranged to receive the depending stud 33 therethrough (see Fig. 3). The lower face of said shoe may be conically countersunk as at 75, 76, etc. and which latch receiving depressions are respectively spaced around a circular path in uniform pitch to correspond with the teeth 65 to 71 (see Fig. 8).

The depending stem 33 may be provided with a self-latching tubular detent 77 of which one end may be conically tapered to be retained in a registering slot countersink when the floating shoe 62 assumes a predetermined angular relation to the casing 15. The allowed shoe movement to either side of its centralized position, is limited to the angle designated B which is materially greater than the shift angle A. It is preferred to slightly inset the tips of the square faced teeth with respect to the outer medial perimeter 72 of said floating shoe to avert unwanted shift by pawl drag.

The respective toes of my double acting pawls 18 and 19 are sufficiently wide to straddle my composite track and to traverse the respective multiple cam profiles thereof when the steering wheel is rotated. It will be obvious that the underlying combined cam principle herein contemplated need not be confined to coordinated flat disc edges, but that the same results are likewise to be had by the use of other types of mated cam profiles, such for instance as the upturned type taught in my aforesaid prior patent.

From the wiring diagram of Fig. 10, it will be understood that the centralized brush of my controller may be supplied through the circuit 78 with a source of current such as a car storage battery K. The outer brushes in pockets 42 and 44 each command separate circuits 79 and 80 respectively leading to the left hand and right hand direction lamps marked L and R. By manually turning the shift lever 55 in a given direction, a corresponding signal will be lighted, the commutator segment then bridging the central contact brush and an appropriate adjacent brush.

The mode of automatic operation of the composite tracks or clutch means embodied in my controller may be traced by reference to Figs. 2 and 4. In the first named view, the shiftable lever 55 stands in its neutral switch or mid dwell position in alignment with the center line X—Y. The reversed kickoff edges 50 and 50' are then exposed through the respective side cam indentations or trapezoidal profile gaps 27 and 28 in the annulus 26. The corresponding side indentations 63 and 64 of the shoe 62 now respectively lie in registry with the gaps 27 and 28. In addition, both kickoff edges 51 and 51' are protectively masked behind an inclined edge of their respective registering side indentations. In such lever dwell position, the rectilinear horseshoe ends of the plate 47 extend in substantial parallelism with the line X—Y to leave the centralized ratchet tooth 68 exposed through the medial annulus indentation 29. It is pointed out that both pawl toes are allowed to ride inactively over my outstanding cam edge not squarely faced toward the direction of a prevailing toe movement.

The steering wheel may be afforded a predetermined rotative leeway through an angular movement of about 90° in either direction away from its straight away reference station X—Y without allowing the pawls 18 or 19 to operatively engage either of the outstanding kickon edges 50 or 50'. However, should such initial leeway station be exceeded while making a sharp counterclockwise vehicle turn in the direction of the Fig. 2 arrow, the then approaching toe of the pawl 19 will first strike the exposed kickon edge 50 and thereby positively shift the oscillatory plate 47 together with its attached lever 55 and the commutator segment 57, through the angle A into one of their extreme travel positions. As a result of the accompanying brush setting, the left hand lighting circuit 79 will now be closed.

While the resilient pawl 19 traverses the trapezoidal side indentation 27 in the arrowed direction, its toe will initially slide radially inward over the masked edge 51 into operative engagement with the outstanding kickon edge 50 to shift the same into a masked position wherein said pawl will disengage itself because of the opposed rising incline given to my trapezoidal track indentation. After said lever has been automatically thrown into its extreme counterclockwise position, further angular movement will be stopped by the tit 32. At the same time, the previously masked kickoff edge 51 will be withdrawn and left standing in a substantially perpendicular dwell position to the reference line X—Y until the steering wheel is reversed. The other kickon edge 50' is then carried onward to partially close the profile gap or side indentation 28 in the Fig. 2A manner.

During a further onward turning of the steering wheel, the pawl 19 will next strike the uncovered central ratchet tooth 68 and thereby positively advance the floating shoe 62 by one tooth pitch where it will be releasably retained by the stud latch 77. As a result, the indented shoe gaps 63 and 64 will become correspondingly shifted with respect to the similar gaps 27 and 28 to shieldingly protect the exposed kickoff edge 51. Upon being struck, the tooth 68 is brought into a sheltered position behind the annulus 26 and the engaged pawl toe will thereupon automatically free itself by riding radially outward along the inclined edge of the track indentation 29.

The composite cam profiles are now so disposed as to permit a successive onward turning of the steering wheel in the arrowed direction without allowing either kickoff edge to be actuated by the pawls 18 or 19. After the pawls approach and pass through one and a half revolutions, the exposed ratchet tooth 69 will likewise be struck by the pawl 19 which again advances the floating shoe in sequence to expose the next tooth 70. Finally, upon having completed two and a half wheel turns, the intermittently rotated shoe may be brought into one of its extreme positions that is represented in Fig. 4. The shoe 62 will then have been shifted stepwise through an angle designated B in which the last tooth 71 becomes exposed. It will be observed that the subtended trailing shoe edge 73 closes the cam gap 27 and thereby protects the set kickoff edge 51 from being pawl actuated until such time that a reversal of the steering wheel returns the central tooth 68 toward its original position. This protective feature constitutes the primary function of the floating shoe 62 which serves in the capacity of a timing element or wheel turn recorder.

After assuming its Fig. 4 position, the steering wheel may still be turned onward by almost another revolution in a counterclockwise direction, which range makes adequate provision to meet all normal steering requirements. Additional ratchet teeth might be added should a greater number of turn registrations be needed.

Upon reversing the steering wheel toward its original straight ahead position, the pawl 18 will first positively strike the now exposed ratchet tooth 71 (see Fig. 4) without however being allowed to actuate any of the shielded edges of the shifted plate 47 while it stands in such a dwell position. Continued reversal or clockwise wheel turning will finally bring the ratchet tooth 68 back into its centralized position shown in Fig. 2 but the wheel must still be advanced about a half revolution in order to reach its straight ahead station. After turning the wheel onward clockwise within a three-quarter turn of such original station, the pawl 18 will be carried into abutment with the now exposed kickon edge 50' of the dwelling plate 47 (see Fig. 2). This serves to automatically and positively return the lever 55 into neutral position and at the same time extinguish the given left hand lamp signal.

Because of my balanced composite tracks, a corresponding sequence of events will be brought about when a right hand turn is to be effected. It remains to emphasize that the described automatic controller performance is herein supplemented by the selectively shiftable lever 55. Normally the driver is intended to manually set such lever in advance of making a contemplated turn. As a result, the previously masked kickoff edges 51 and 51' will be positively thrown into their respective active or exposed positions and serve the same purpose as though one of the kickon edges had belatedly shifted said lever in a like direction. My protective edge shielding device becomes operative whenever the steering wheel exceeds its prescribed initial rotative leeway and remains so until a reversal of rotation returns the wheel into a prescribed station.

It will be observed that in Fig. 2, the indented perimetric length of the track gaps 27 and 28 have been so chosen as to reversely set off the opposed kickon edges 50 and 51 by a small gap marked C whereby a counterclockwise shift of the lever 55 will leave a corresponding gap similarly designated in Fig. 2A. The purpose of such refinement is to provide for self-rectifying clutch means and thereby insure a proper sequence of events should a driver falsely indicate a turn signal and thereupon proceed to steer in the opposite direction. Assuming such inadvertence to occur in making an actual clockwise turn, the lever 55 will have been manually shifted to set the cam edge 50' as in Fig. 2A. Should the steering wheel now follow up clockwise, the pawl 18 will drop into the gap C to initially throw the edge 50' through twice the angle A and thus automatically shift the lever 55 into a corrected position corresponding to the turn being made.

In the present exemplification, the angular pitch between the shoe teeth 67, 68, etc. has been chosen as substantially equal to the lever shift angle A, but in certain instances a materially greater tooth pitch may be expedient. When made as shown, the actuated floating disc does not fully mask an exposed kickon edge 50 or 50' until the steering wheel has been turned through more than a complete revolution. During the reversal of the wheel toward its straight ahead position, an appropriate pawl will as a consequence, engage said exposed kickon edge to return the lever into neutral position prior to finally shifting the tooth 68 into its normal centralized Fig. 2 position. When resorting to an augmented tooth pitch, one of the exposed kickoff edges 51 or 51' will be struck to perform a like function subsequent to the return of said tooth 68, thus inverting the functional behavior of my pawl actuated cam edges.

It is pointed out that the steering wheel need not be rotated through the entire number of revolutions for which tooth provision has been made, since the mechanism correctly operates in a similar manner when utilizing a smaller number of the available wheel turns. If desired, an augmented angular leeway may be secured by setting back the pawl toes with respect to their associated kickon edges or by a modified track disposition.

In lieu of the horseshoe shaped plate 47 and shoe 62, these elements may be given a completed ring shape. As shown, such all-stamped working parts may be applied to an existing steering column as an automotive accessory, or may be expeditiously assembled as new equipment subsequent to installing the steering column 11 in place. In either case, the component split controller members can more readily be demounted and serviced for repairs.

Finally, referring more specifically to Figs. 11 and 12, the working parts are substantially similar to those previously described except that there are here disclosed positive means for actuating the modified slidable detent 82 mounted about the depending stem 83. The lower end of said tubular detent may be flanged to have a relatively heavy or primary return spring 84 thrust upwardly thereagainst. The upper flange face may coact with a contacting heel formed medially upon the forked detent rocker 85. Corresponding offset inner ends of this rocker may be pivotally riveted to the outstanding ears such as 86 that may be integrally stamped out of one housing section, as shown. The upper end of my detent may or may not be crowned by a loosely telescoped hood or interposed pilot 94 shaped to successively register in slot countersinks such as 76, said pilot being subjected to thrust by the relatively light auxiliary spring as shown. Such pilot yieldingly follows up and snaps into the next registering countersink although this adjunct may be eliminated when an integral tip of the detent 82 is itself shaped conically to perform a similar pilot duty.

The radially outermost lever end may be intermittently but expeditiously depressed through its upstanding rounded cam toe 81 by a small cam roller 87 operatively attached to the skirt of the cupshaped casing 88. The roller is made to ride abruptly over the cam toe to rapidly depress the outer lever end against tension of the primary spring 84. When released, this spring is sufficiently strong to overpower the balanced auxiliary spring 95. My positively actuated detent acts in the manner of an escapement mechanism which is preferably so timed that the floating shoe 62 only becomes unlocked for a brief period after one of the pawls has substantially dropped into effective engagement with a shoe tooth to initiate a shift thereof. Immediately upon completing a prescribed angular throw station of the floating shoe as confined to a single tooth pitch, the prompt withdrawal of the cam roller allows the returned rocker to seat the tubular detent against the cooperating pilot and thereby reenforce its registered dowellike hold against inadvertent drag or other unwanted shift on part of my floating shoe.

As an additional safeguard fixing the limits of shift travel on part of the manipulative lever 55, I may provide for a flanged pointer bracket 89 that includes a pair of spaced upstanding stop lugs such as 90 respectively located at different sides of said lever. Owing to the relatively small angular shift A, said lugs further serve as reference points whereby to visualize the prevailing set position of my lever. Said bracket may be stamped from sheet metal to include a pair of claws such as 91 which are respectively clenched into supplementary kerfs 92 formed in the insulator block 93 as detailed in Fig. 12.

It is thought the foregoing disclosure will make apparent to those skilled in this art, the inherent advantages afforded by my improved controller assembly, it being understood the floating shoe 62 may be eliminated when devising a modified signal in which the lever 55 is not automatically shifted into an active position, also that various changes in the illustrative structural details of my composite tracks and the housing mounting thereof may be resorted to, all without departing from the spirit and scope of my invention heretofore described and more particularly defined in the appended claims.

I claim:

1. In an electrical direction indicator signal of the fully automatic type for an automotive vehicle including a steering wheel, the combination of controller means equipped with an oscillatory switch carrier part including a make and break contact component having a neutral dwell position and which controller means are provided with actuated clutch means and control means therefor operatively interposed between the steering wheel and said carrier part, the controlled clutch means being so organized and arranged that after an initiated wheel turn reaches a predetermined leeway station said clutch will automatically become engaged to positively shift the carrier part in unison with the steering wheel from said dwell position into an active switch position and which clutch automatically releases the steering wheel subsequent to being rotated onward beyond such leeway station, said clutch upon a reversal of wheel rotation further serving to pick up such released carrier part and automatically reinstate the same into said dwell position after the returning wheel closely approaches said leeway station and in which dwell position the control means again releases the clutch to temporarily cease shifting the carrier part in unison with a continued reversed rotation of the steering wheel.

2. In an electrical direction indicator signal of the fully automatic type for an automotive vehicle including a steering wheel, the combination of controller means equipped with an oscillatory switch carrier part including a make and break contact component having a neutral dwell position and which controller means are provided with actuated clutch means and control means therefor operatively interposed between the steering wheel and said carrier part, the controlled clutch means being so organized and arranged that after an initiated wheel turn reaches a predetermined leeway station said clutch will automatically become engaged to positively shift the carrier part in unison with the steering wheel from said dwell position into an active switch position and which clutch automatically releases the steering wheel subsequent to being rotated onward beyond such leeway station, said clutch upon a reversal of wheel rotation further serving to pick up such released carrier part and reinstate the same into said dwell position after the returning wheel closely approaches said leeway station and in which dwell position the control means again releases the clutch to temporarily cease shifting the carrier part in unison with a continued reversed rotation of the steering wheel, and manipulative lever means for independently preshifting and setting said carrier out of its neutral switch position prior to initiating a vehicle turn.

3. In an electrical direction indicating signal for an automotive vehicle including a steering wheel, the combination of signal controller means provided with a shiftable make and break switch element intermittently actuated by an oscillatory controller part having a pair of laterally spaced edges disposed to cooperate with stationary cam means including a profile indentation having a length greater than the spacing between said edges to alternately mask one such edge and exposes its mate when the oscillatory part actuates the switch component, independent manipulative lever means serving to similarly shift the switch component, said lever means being arranged to be set manually prior to making a contemplated vehicle turn, pawl means, means operatively connecting the pawl means to traverse said profile indentation in unison with the steering wheel when rotated in a given direction beyond a predetermined leeway station located in advance of the straight ahead wheel station, said pawl means serving to positively engage an exposed edge and simultaneously withdraw its mated edge upon failure to previously set the lever means whereby to automatically shift the switch into closed position while said wheel is being rotated onward beyond such leeway station, and protective means shielding said withdrawn edge against pawl engagement until the steering wheel has been reversed.

4. In an electrical direction indicating signal for an automotive vehicle including a steering wheel, the combination of controller means comprising a stationary part having cam profile means cooperatively associated with a pair of relatively movable controller parts respectively provided with differently shaped cam profile means to constitute an endless composite track, common pawl means operatively connected to move in unison with the steering wheel and arranged to traverse the composite track in straddling relationship to the profile components thereof, a make and break switch element carried by one of the movable controller parts and which one part is shifted by said pawl means into a certain dwell position when the steering wheel is rotated in a given direction through a range of more than a single revolution from its straight ahead station, the other movable part being pawl actuated and timed to protectively shield said one part in its dwell position against pawl actuation until the steering wheel by a reversal of rotation is returned within less than a single revolution from such straight ahead station.

5. In an electrical direction indicating signal for an automotive vehicle including a steering wheel, the combination of controller means comprising a split stationary annular part having a perimetrically disposed cam profile cooperatively associated with a pair of relatively movable controller parts each having a horseshoe shape that are reversely superimposed and the perimetric regions of which movable parts are respectively provided with differently shaped cam profiles arranged alongside the cam profile of the annular part to constitute an endless composite track, common pawl means operatively connected to move in unison with the steering wheel to traverse the composite track in a straddling relationship to the profile components thereof and thereby shift one of the movable controller parts from a neutral into a certain dwell position when the steering wheel is rotated onward through an initial leeway station located in advance of the straight ahead wheel station, the other movable part being also pawl actuated and timed to protectively shield said one part in its dwell position against pawl actuation until a reversal of rotation returns the steering wheel toward the aforesaid leeway station.

6. In an electrical direction indicating signal for an automotive vehicle including a steering wheel, the combination of controller means comprising a stationary part equipped with perimetrically disposed cam profile means cooperatively associated with an oscillatory part having a different perimetric cam profile to constitute an endless composite track, pawl means operatively connected to move in unison with the steering wheel and arranged to traverse said track in a straddling relationship to the profile components thereof, a make and break switch element mounted to shift in unison with the oscillatory part and which last named part is actuated by said pawl means from a neutral into an active switch position when the steering wheel is rotated in a corresponding direction by more than a prescribed leeway, said controller further comprising a floating shoe part provided with a perimetric cam profile including a series of double acting ratchet teeth which are regularly advanced in sequence by said pawl means as a timed wheel turn recorder, said oscillatory part during such recorded interim remaining protectively shielded against pawl actuation until by a reversal of wheel rotation the first engaged tooth is substantially returned into its initial position.

7. In a direction signal for an automotive vehicle including a rotatable steering wheel, the combination of controller means comprising a stationary part equipped with cam profile means cooperatively associated with an oscillatory part provided with different cam profile means arranged alongside the first named profile means to constitute an endless composite track, pawl means operatively connected with said steering wheel to traverse the length of said track and serving to relatively shift the respective profile means, floatingly mounted shoe means having profile means disposed in a cooperative shiftable relation to said track and impelled by the pawl means to protectively shield said oscillatory part against being actuated when turning the steering wheel in a given direction beyond a prescribed angular position, and actuated positive locking means applied to retain and to release the shoe means in a timed relation to the continued onward turning of the steering wheel and thereby allow the shoe to be impelled in a like direction, said locking means being arranged to release said shoe only during a period substantially corresponding to the impelling thereof.

8. In a direction signal for an automotive vehicle including a rotatable steering wheel, the combination of controller means comprising a stationary part equipped with cam profile means cooperatively associated with an oscillatory part provided with different cam profile means arranged alongside the first named profile means to constitute an endless composite track, pawl means operatively connected with said steering wheel to traverse the length of said track and serving to relatively shift the respective profile means, floatingly mounted shoe means having profile means disposed in a cooperative shiftable relation to said track and impelled by the pawl means to protectively shield said oscillatory part against being actuated when turning the steering wheel in a given direction beyond a prescribed angular position, and actuated positive locking means applied to alternately retain and release the shoe means in timed synchronism with the continued onward turning of the steering wheel for stepwise shoe advance, said locking means being arranged as an escapement mechanism by which said shoe is intermittently released only during the respective timed periods of shoe advance.

9. In an electrical direction indicating signal for an automotive vehicle including a steering wheel, the combination of controller means provided with an oscillatory part carrying a double throw make and break switch element, controllable clutch means operatively connecting said oscillatory part with the steering wheel and serving to positively shift said element from neutral into alternative active positions in unison with corresponding steering wheel movements whereupon the controlled clutch means is released, said clutch means after reversal of wheel rotation being again brought into engagement to return the oscillatory part into its medial neutral position wherein by clutch disengagement said part ceases to shift in unison with a continued reverse rotation of the steering wheel, and manipulative lever means for independently preshifting and setting the switch element out of its neutral position into one such active position to give a signal in advance of actually making a contemplated vehicle turn, said clutch means further comprising self-rectifying means serving to automatically reset said lever into a corrective relationship with respect to said oscillatory part should said lever have been preshifted into a false active position contrary to the contemplated vehicle turn.

10. In an electrical direction indicating signal or the like, the combination of a controller including a positively actuated double-throw make and break switch element arranged to dwell in a medial neutral position, disengageable actuating means serving to periodically shift said element from neutral into one of its alternative active positions and to return the switch element into its neutral position and allow said element to definitely dwell therein by a disengagement of the actuating means, manipulative preshifting lever means arranged to independently set said element out of its neutral position into the other of said active positions, and automatic rectifying means serving to positively reset the preshifted lever into the aforesaid one active position in advance of the actuating means whereby to bring the switch element into proper synchronism with the last named means.

11. In an electrical direction indicating signal for an automotive vehicle including a steering wheel requiring more than one complete revolution to effect a relatively sharp vehicle turn, the combination of controller means provided with an oscillatory part arranged to actuate double throw make and break switch means having a neutral position, controllable clutch means for intermittently connecting the oscillatory part with the steering wheel to selectively set said switch means from neutral into one of its active positions in unison with a corresponding steering wheel movement, and timed wheel-turn recorder means disposed to command the clutch means, said actively set oscillatory part during a recorded interim remaining protectively shielded against release into its neutral position until the direction of initial steering wheel rotation has been reversed.

HARVE R. STUART.